US008548615B2

(12) United States Patent
Ojanperä

(10) Patent No.: US 8,548,615 B2
(45) Date of Patent: Oct. 1, 2013

(54) ENCODER

(75) Inventor: Juha Petteri Ojanperä, Nokia (FI)

(73) Assignee: Nokia Corporation, Espoo (FI)

( * ) Notice: Subject to any disclaimer, the term of this patent is extended or adjusted under 35 U.S.C. 154(b) by 622 days.

(21) Appl. No.: 12/745,233

(22) PCT Filed: Nov. 27, 2007

(86) PCT No.: PCT/EP2007/062911

§ 371 (c)(1),
(2), (4) Date: Aug. 5, 2010

(87) PCT Pub. No.: WO2009/068085

PCT Pub. Date: Jun. 4, 2009

(65) Prior Publication Data

US 2010/0305727 A1 Dec. 2, 2010

(51) Int. Cl.
*G06F 17/00* (2006.01)

(52) U.S. Cl.
USPC ................... 700/94; 381/17; 381/18; 381/22; 381/23; 704/500; 704/501; 704/502; 704/503; 704/504

(58) Field of Classification Search
USPC ........................................................... 700/94
See application file for complete search history.

(56) References Cited

U.S. PATENT DOCUMENTS

| | | | | |
|---|---|---|---|---|
| 5,539,829 | A | 7/1996 | Lokhoff et al. | |
| 5,606,618 | A | 2/1997 | Lokhoff et al. | |
| 8,073,144 | B2 * | 12/2011 | Henn et al. | 381/23 |
| 8,081,763 | B2 * | 12/2011 | Henn et al. | 381/22 |
| 8,180,061 | B2 * | 5/2012 | Hilpert et al. | 381/22 |
| 8,311,809 | B2 * | 11/2012 | Schuijers et al. | 704/203 |
| 2004/0267543 | A1 * | 12/2004 | Ojanpera | 704/500 |
| 2005/0157883 | A1 * | 7/2005 | Herre et al. | 381/17 |
| 2005/0180579 | A1 * | 8/2005 | Baumgarte et al. | 381/63 |
| 2006/0085200 | A1 * | 4/2006 | Allamanche et al. | 704/500 |
| 2006/0116886 | A1 * | 6/2006 | Kim et al. | 704/503 |
| 2008/0049943 | A1 * | 2/2008 | Faller et al. | 381/17 |
| 2010/0305727 | A1 | 12/2010 | Ojanpera | |

FOREIGN PATENT DOCUMENTS

| | | | |
|---|---|---|---|
| EP | 2212883 | A1 | 8/2010 |
| WO | WO-2004/008806 | A | 1/2004 |
| WO | WO-2004/098105 | A | 11/2004 |
| WO | WO-2009/068085 | A1 | 6/2009 |

OTHER PUBLICATIONS

International Search Report and Written Opinion for Application No. PCT/EP2007/062911, dated May 8, 2008.
Bernhard, G., et al., *Proposal for a Joint Stereo Add-On to the Scalable T/F Coder*, Video Standards and Drafts (1997) Document unavailable.

(Continued)

*Primary Examiner* — Paul McCord
(74) *Attorney, Agent, or Firm* — Alston & Bird LLP

(57) ABSTRACT

An encoder for encoding an audio signal comprising at least two channels, the encoder configured to generate an encoded signal comprising at least a first part, a second part and a third part, wherein the encoder is further configured to: generate the first part of the encoded signal dependent on at least one combination of first and second channels of the at least two channels; generate the second part of the encoded signal dependent on at least one difference between the first and second channels of the at least two channels; and generate the third part of the encoded signal dependent on at least one energy ratio of the first and second channels of the at least two channels.

12 Claims, 6 Drawing Sheets

(56) References Cited

OTHER PUBLICATIONS

Faller, C., et al., *Binaural Cue Coding Applied to Stereo and Multi-Channel Audio Compression*, Preprints of Papers Presented at the AES Convention, vol. 112, No. 5574 (2002) 9 pages.

Herre, J., et al., *Intensity Stereo Coding*, Preprints of Papers Presented at the AES Convention, vol. 96, No. 3799 (1994).

Johnson, J., et al., *Sum-Difference Stereo Transform Coding*, ICASSP-92 Conference Record (1992) pp. 569-572.

* cited by examiner

ENCODER

RELATED APPLICATION

This application was originally filed as PCT Application No. PCT/EP2007/062911 filed Nov. 27, 2007.

FIELD OF THE INVENTION

The present invention relates to coding, and in particular, but not exclusively to speech or audio coding.

BACKGROUND OF THE INVENTION

Audio signals, like speech or music, are encoded for example for enabling an efficient transmission or storage of the audio signals.

Audio encoders and decoders are used to represent audio based signals, such as music and background noise. These types of coders typically do not utilise a speech model for the coding process, rather they use processes for representing all types of audio signals, including speech.

Speech encoders and decoders (codecs) are usually optimised for speech signals, and can operate at either a fixed or variable bit rate.

An audio codec can also be configured to operate with varying bit rates. At lower bit rates, such an audio codec may work with speech signals at a coding rate equivalent to a pure speech codec. At higher bit rates, the audio codec may code any signal including music, background noise and speech, with higher quality and performance.

In stereo audio encoders, the received audio signal contains left and right channel audio signal information. Dependent on the available bit rate for transmission or storage different encoding schemes may be applied to the input channels. The left and right channels may be encoded independently, however there is typically correlation between the channels and many encoding schemes and decoders use this correlation to further reduce the bit rate required for transmission or storage of the audio signal.

Two commonly used stereo audio coding schemes are mid/side (MS) stereo encoding and intensity stereo (IS) stereo encoding. In MS stereo, the left and right channels are encoded into a sum and difference of the channel information signal. This encoding process therefore uses the correlation between the two channels to reduce the complexity with regard to the difference signal. In MS stereo, the coding and transformation is typically done both in frequency and time domains. MS stereo encoding has typically been used in high quality high bit rate stereophonic coding. MS coding however can not produce significantly compact coding for low bandwidth encoding.

IS coding, is preferred in mid-low bandwidth encoding scenarios. In IS coding a portion of the frequency spectra is coded using a mono encoder and the stereo image is reconstructed at the receiver/decoder by using scaling factors to separate the left and right channels.

IS coding produces a stereo encoded signal with typically lower stereo separation as the difference between the left and right channels is reflected by a gain factor only.

As is known in the art certain spectral frequencies are more significant with regards to the perception of the audio signal than others. Both MS and IS stereo encoding fails to use this information and does not encode the stereo signal optimally.

SUMMARY OF THE INVENTION

This invention proceeds from the consideration that whilst MS stereo and IS stereo may produce an approximate stereo image, an advantageous image may be achieved by the use of stereo processing using the information for both IS and MS coding schemes for different frequency bands.

Embodiments of the present invention aim to address the above problem.

There is provided according to a first aspect of the present invention an encoder for encoding an audio signal comprising at least two channels, the encoder configured to: generate an encoded signal comprising at least a first part, a second part and a third part, wherein the encoder is further configured to: generate the first part of the encoded signal dependent on at least one combination of first and second channels of the at least two channels; generate the second part of the encoded signal dependent on at least one difference between the first and second channels of the at least two channels; and generate the third part of the encoded signal dependent on at least one energy ratio of the first and second channels of the at least two channels.

The encoder may be further configured to generate the first part of the encoded signal dependent on a received time domain representation of the audio signal.

Each of the at least one combination of the first and second channels may comprise an average of at least one time domain sample from the first channel and an associated at least one time domain sample from the second channel.

The first part of the encoded signal is preferably a time domain encoded signal.

The first part of the encoded signal is preferably generated by at least one of: advanced audio coding (AAC); MPEG-1 layer 3 (MP3), ITU-T embedded variable rate (EV-VBR) speech coding base line coding; adaptive multi rate-wide band (AMR-WB) coding; and adaptive multi rate wide band plus (AMR-WB+) coding.

The first and second channels of the at least two channels are preferably time domain representations, and the encoder is preferably further configured to generate a first and second frequency domain representation of the first and second channels, wherein each of the first and second frequency domain representations of the first and second channels may comprise at least two spectral coefficient values.

The second part of the encoded signal may comprise at least two difference values wherein each difference value is preferably dependent on the difference between a first channel spectral coefficient value and an associated second channel spectral coefficient value.

The encoder may be further configured to generate the first and second frequency domain representations of the first and second channels by transforming the time domain representations of the first and second channels, wherein transforming comprises one of: a shifted discrete fourier transform; a modified discrete cosine transform; and a discrete unitary transform.

The encoder may further be configured to group the at least two spectral coefficient values from each of the first and second frequency domain representations of the first and second channels into at least two sub-bands, each channel sub-band comprising at least one spectral coefficient value.

The third part of the encoded signal may comprise at least two energy ratios, wherein each energy ratio is associated with a sub-band, wherein the encoder is preferably configured to generate each energy ratio by determining the ratio, for each associated sub-band, of the maximum of the first and the second channels energies and the minimum of the first and the second channels energies.

According to a second aspect of the invention there is provided a decoder for decoding an encoded signal configured to: divide the encoded signal received for a first time period into at least a first part, a second part and a third part, wherein the first, second and third parts represent an encoded first and second channels of a multichannel audio signal; generate a first decoded signal dependent on the first part; and generate at least one further decoded signal dependent on the first decoded signal, and at least one of the second and third parts of the encoded signal.

Each of the at least one further decoded signals may comprise at least two portions; the decoder being preferably further configured to: determine at least one characteristic of the encoded signal associated with at least one portion of the at least one further decoded signal; select one of the second or third parts of the encoded signal dependent on the characteristic associated with the at least one portion of the at least one further decoded signal; and generate the at least one part of the at least one further decoded signal dependent on the first decoded signal and the selected one of the second or third parts.

The characteristic preferably comprises at least one of: an auditory gain greater than a threshold value; an auditory scene being wholly located in at least one of the encoded first and second channels; and the second part not being null.

The first decoded signal may comprise at least one combined channel frequency domain representation.

Each combined channel frequency domain representation may comprise at least two combined channel spectral coefficient portions, each combined channel spectral portion may comprise at least one spectral coefficient value.

The second part of the encoded signal may comprise at least one side channel value.

Each side channel value is preferably dependent on a difference between a first channel spectral coefficient value and the second encoded channel spectral coefficient value.

The third part of the encoded signal may comprise at least one intensity side channel encoded value.

Each intensity side channel encoded value preferably comprises an encoded energy ratio between the maximum of a portion of the first encoded channel spectral coefficients and a portion of the second encoded channel spectral coefficients, and the minimum of the portion of the first encoded channel spectral coefficients and the portion of the second encoded channel spectral coefficients.

The first part is preferably an encoded combined channel time domain audio signal.

According to a third aspect of the present invention there is provided a method for encoding an audio signal comprising at least two channels, comprising: generating an encoded signal comprising at least a first part, a second part and a third part, wherein generating the encoded signal further comprises: generating the first part of the encoded signal dependent on at least one combination of first and second channels of the at least two channels; generating the second part of the encoded signal dependent on at least one difference between the first and second channels of the at least two channels; and generating the third part of the encoded signal dependent on at least one energy ratio of the first and second channels of the at least two channels.

Generating the first part may further comprise generating the first part of the encoded signal dependent on a received time domain representation of the audio signal.

Generating the first part may further comprise averaging at least one time domain sample from the first channel and an associated at least one time domain sample from the second channel.

The first part of the encoded signal is preferably a time domain encoded signal.

The generating the first part may comprise applying at least one of: advanced audio coding (AAC); MPEG-1 layer 3 (MP3), ITU-T embedded variable rate (EV-VBR) speech coding base line coding; adaptive multi rate-wide band (AMR-WB) coding; and adaptive multi rate wide band plus (AMR-WB+) coding.

The first and second channels of the at least two channels are preferably time domain representations, the method may further comprise generating a first and second frequency domain representation of the first and second channels, wherein each of the first and second frequency domain representations of the first and second channels may comprise at least two spectral coefficient values.

The second part of the encoded signal may comprise at least two difference values wherein each difference value is dependent on the difference between a first channel spectral coefficient value and an associated second channel spectral coefficient value.

The generating the first and second frequency domain representations of the first and second channels may comprise transforming the time domain representations of the first and second channels, wherein transforming may comprise one of: a shifted discrete fourier transform; a modified discrete cosine transform; and a discrete unitary transform.

The method may further comprise grouping the at least two spectral coefficient values from each of the first and second frequency domain representations of the first and second channels into at least two sub-bands, each channel sub-band may comprise at least one spectral coefficient value.

The third part of the encoded signal may comprise at least two energy ratios, wherein each energy ratio is associated with a sub-band, wherein the method preferably comprises generating each energy ratio by determining the ratio, for each associated sub-band, of the maximum of the first and the second channels energies and the minimum of the first and the second channels energies.

According to a fourth aspect of the invention there is provided a method for decoding an encoded signal comprising: dividing the encoded signal received for a first time period into at least a first part, a second part and a third part, wherein the first, second and third parts represent an encoded first and second channels of a multichannel audio signal; generating a first decoded signal dependent on the first part; and generating at least one further decoded signal dependent on the first decoded signal, and at least one of the second and third parts of the encoded signal.

Each of the at least one further decoded signals may comprise at least two portions; the method may further comprise: determining at least one characteristic of the encoded signal associated with at least one portion of the at least one further decoded signal; selecting one of the second or third parts of the encoded signal dependent on the characteristic associated with the at least one portion of the at least one further decoded signal; and generating the at least one part of the at least one further decoded signal dependent on the first decoded signal and the selected one of the second or third parts.

The characteristic may comprises at least one of: an auditory gain greater than a threshold value; an auditory scene being wholly located in at least one of the encoded first and second channels; and the second part not being null.

The first decoded signal may comprise at least one combined channel frequency domain representation.

Each combined channel frequency domain representation may comprise at least two combined channel spectral coefficient portions, each combined channel spectral portion may comprise at least one spectral coefficient value.

The second part of the encoded signal may comprise at least one side channel value.

Each side channel value is preferably dependent on a difference between a first channel spectral coefficient value and the second encoded channel spectral coefficient value.

The third part of the encoded signal may comprise at least one intensity side channel encoded value.

Each intensity side channel encoded value may comprise an encoded energy ratio between the maximum of a portion of the first encoded channel spectral coefficients and a portion of the second encoded channel spectral coefficients, and the minimum of the portion of the first encoded channel spectral coefficients and the portion of the second encoded channel spectral coefficients.

The first part is preferably an encoded combined channel time domain audio signal.

According to a fifth aspect of the invention there is provided an apparatus comprising an encoder as described above.

According to a sixth aspect of the invention there is provided an apparatus comprising a decoder as described above.

According to a seventh aspect of the invention there is provided an electronic device comprising an encoder as described above.

According to an eighth aspect of the invention there is provided an electronic device comprising a decoder as described above.

According to a ninth aspect of the invention there is provided a chipset comprising an encoder as described above.

According to an tenth aspect of the invention there is provided a chipset comprising a decoder as described above.

According to an eleventh aspect of the invention there is provided a computer program product configured to perform a method of encoding an audio signal comprising at least two channels, comprising: generating an encoded signal comprising at least a first part, a second part and a third part, wherein the encoder is further configured to: generating the first part of the encoded signal dependent on at least one combination of first and second channels of the at least two channels; generating the second part of the encoded signal dependent on at least one difference between the first and second channels of the at least two channels; and generating the third part of the encoded signal dependent on at least one energy ratio of the first and second channels of the at least two channels.

According to a twelfth aspect of the invention there is provided a computer program product configured to perform a method of decoding an audio signal comprising: dividing the encoded signal received for a first time period into at least a first part, a second part and a third part, wherein the first, second and third parts represent an encoded first and second channels of a multichannel audio signal; generating a first decoded signal dependent on the first part; and generating at least one further decoded signal dependent on the first decoded signal, and at least one of the second and third parts of the encoded signal.

According to a thirteenth aspect of the invention there is provided an encoder for encoding an audio signal comprising at least two channels, the encoder comprising: processing means for generating an encoded signal comprising at least a first part, a second part and a third part, wherein the generating the encoded signal further comprises: first coding means for generating the first part of the encoded signal dependent on at least one combination of first and second channels of the at least two channels; second coding means for generating the second part of the encoded signal dependent on at least one difference between the first and second channels of the at least two channels; and third coding means for generating the third part of the encoded signal dependent on at least one energy ratio of the first and second channels of the at least two channels According to a fourteenth aspect of the invention there is provided a decoder for decoding an audio signal comprising: signal processing means for dividing the encoded signal received for a first time period into at least a first part, a second part and a third part, wherein the first, second and third parts represent an encoded first and second channels of a multichannel audio signal; first decoding means for generating a first decoded signal dependent on the first part; and second decoding means for generating at least one further decoded signal dependent on the first decoded signal, and at least one of the second and third parts of the encoded signal.

According to an eighth aspect of the present invention there is provided a.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
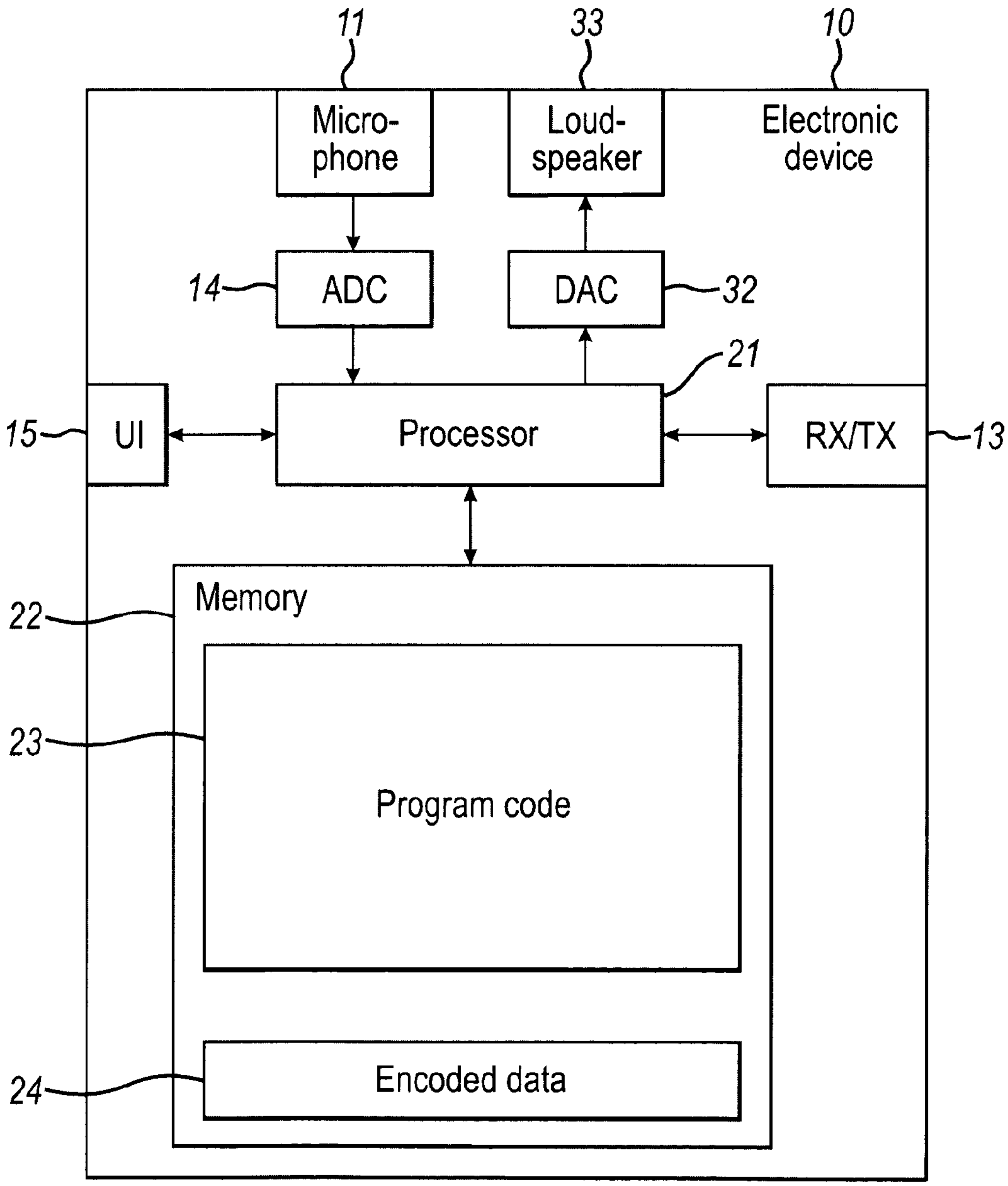
FIG. 1 shows schematically an electronic device employing embodiments of the invention.

The following describes in more detail possible mechanisms for the provision of a low complexity multichannel audio coding system. In this regard reference is first made to FIG. 1 schematic block diagram of an exemplary electronic device 10, which may incorporate a codec according to an embodiment of the invention.

The electronic device 10 may for example be a mobile terminal or user equipment of a wireless communication system.

The electronic device 10 comprises a microphone 11, which is linked via an analogue-to-digital converter 14 to a processor 21. The processor 21 is further linked via a digital-to-analogue converter 32 to loudspeakers 33. The processor 21 is further linked to a transceiver (TX/RX) 13, to a user interface (UI) 15 and to a memory 22.

The processor 21 may be configured to execute various program codes. The implemented program codes comprise an audio encoding code for encoding a combined audio signal and code to extract and encode side information pertaining to the spatial information of the multiple channels. The implemented program codes 23 further comprise an audio decoding code. The implemented program codes 23 may be stored for example in the memory 22 for retrieval by the processor 21 whenever needed. The memory 22 could further provide a section 24 for storing data, for example data that has been encoded in accordance with the invention.

The encoding and decoding code may in embodiments of the invention be implemented in hardware or firmware.

The user interface 15 enables a user to input commands to the electronic device 10, for example via a keypad, and/or to obtain information from the electronic device 10, for example via a display. The transceiver 13 enables a communication with other electronic devices, for example via a wireless communication network.

It is to be understood again that the structure of the electronic device 10 could be supplemented and varied in many ways.

A user of the electronic device 10 may use the microphone 11 for inputting speech that is to be transmitted to some other electronic device or that is to be stored in the data section 24 of the memory 22. A corresponding application has been activated to this end by the user via the user interface 15. This application, which may be run by the processor 21, causes the processor 21 to execute the encoding code stored in the memory 22.

The analogue-to-digital converter 14 converts the input analogue audio signal into a digital audio signal and provides the digital audio signal to the processor 21.

The processor 21 may then process the digital audio signal in the same way as described with reference to FIGS. 2 and 3.

The resulting bit stream is provided to the transceiver 13 for transmission to another electronic device. Alternatively, the coded data could be stored in the data section 24 of the memory 22, for instance for a later transmission or for a later presentation by the same electronic device 10.

The electronic device 10 could also receive a bit stream with correspondingly encoded data from another electronic device via its transceiver 13. In this case, the processor 21 may execute the decoding program code stored in the memory 22. The processor 21 decodes the received data, and provides the decoded data to the digital-to-analogue converter 32. The digital-to-analogue converter 32 converts the digital decoded data into analogue audio data and outputs them via the loudspeakers 33. Execution of the decoding program code could be triggered as well by an application that has been called by the user via the user interface 15.

The received encoded data could also be stored instead of an immediate presentation via the loudspeakers 33 in the data section 24 of the memory 22, for instance for enabling a later presentation or a forwarding to still another electronic device.

Figure 3:
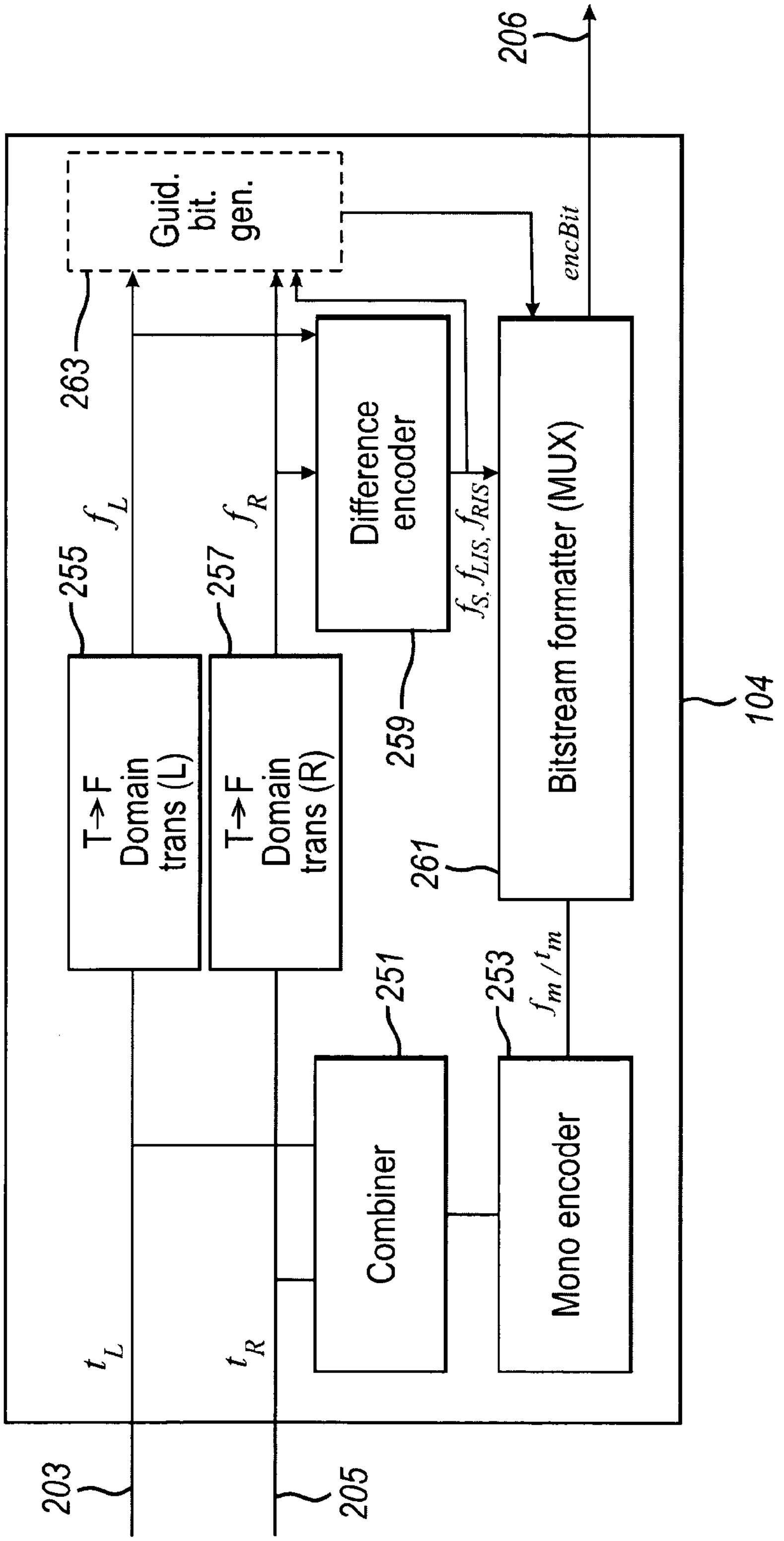
FIG. 3 shows schematically an encoder part of the audio codec system shown in FIG. 2.
Figure 4:
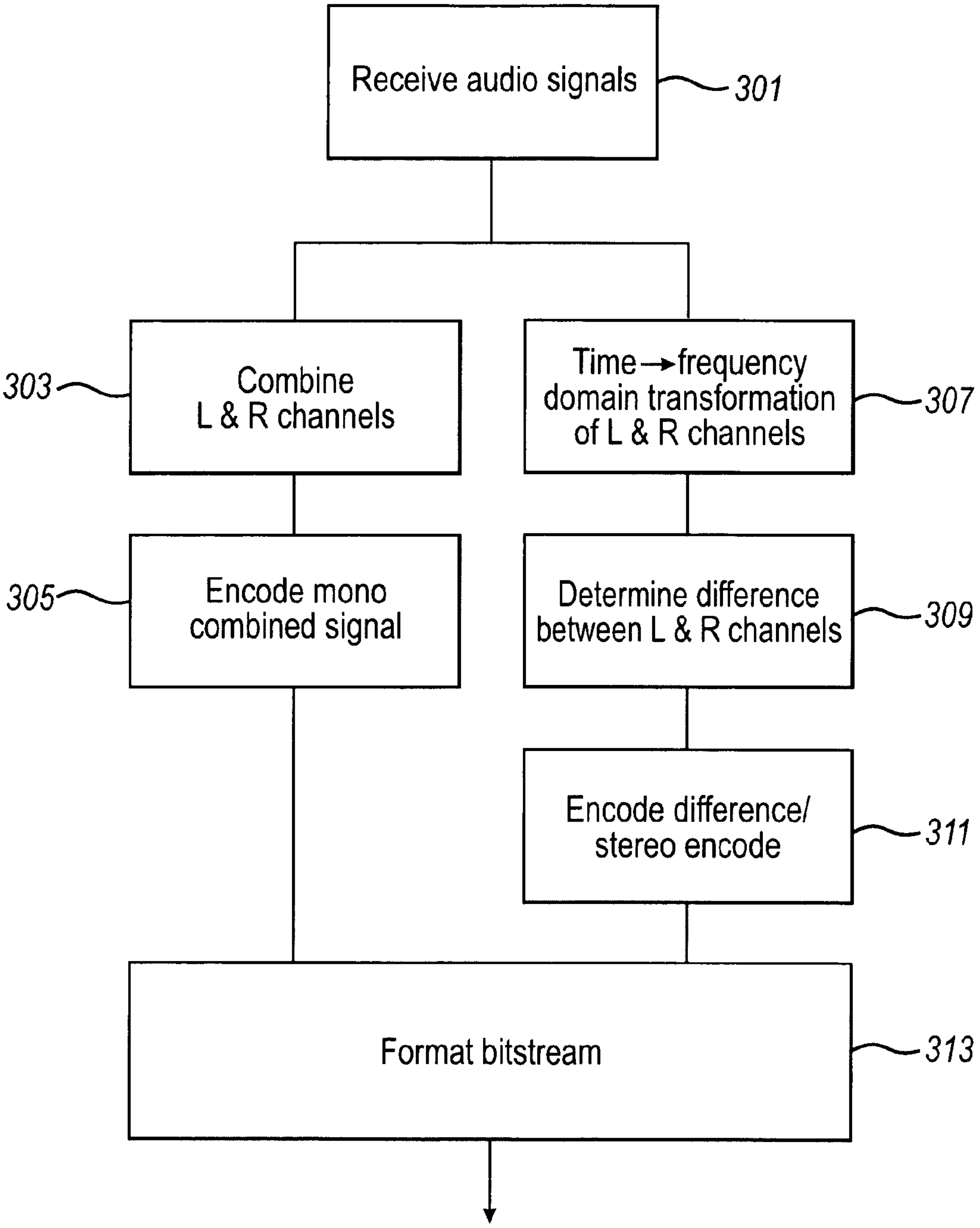
FIG. 4 shows a flow diagram illustrating the operation of an embodiment of the encoder as shown in FIG. 3 according to the present invention.
Figure 5:
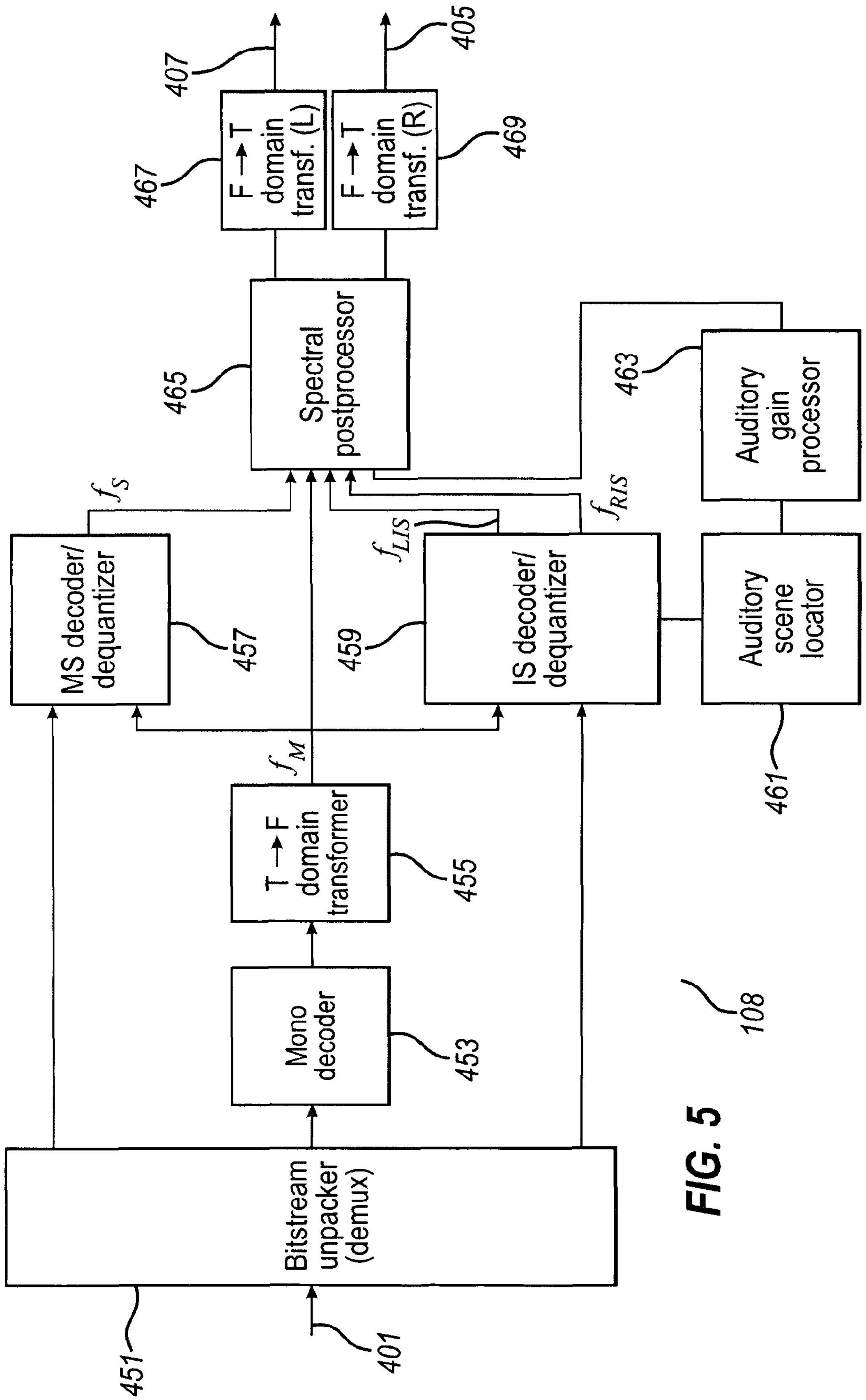
FIG. 5 shows schematically a decoder part of the audio codec system shown in FIG. 2.
Figure 6:
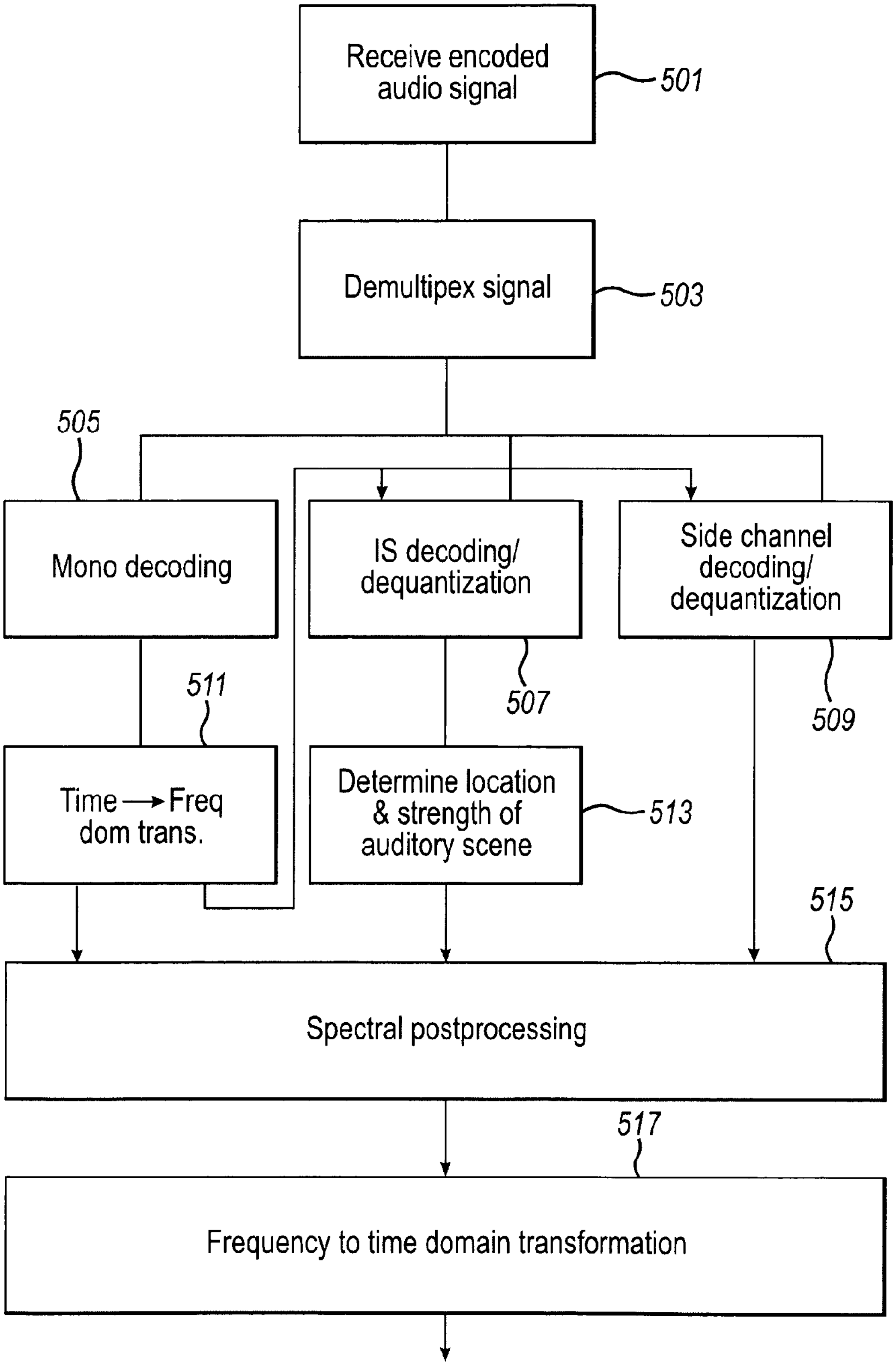
FIG. 6 shows a flow diagram illustrating the operation of an embodiment of the audio decoder as shown in FIG. 5 according to the present invention.

It would be appreciated that the schematic structures described in FIGS. 2, 3, 4 and 7 and the method steps in FIGS. 5, 6 and 8 represent only a part of the operation of a complete audio codec as exemplarily shown implemented in the electronic device shown in FIG. 1.

Figure 2:
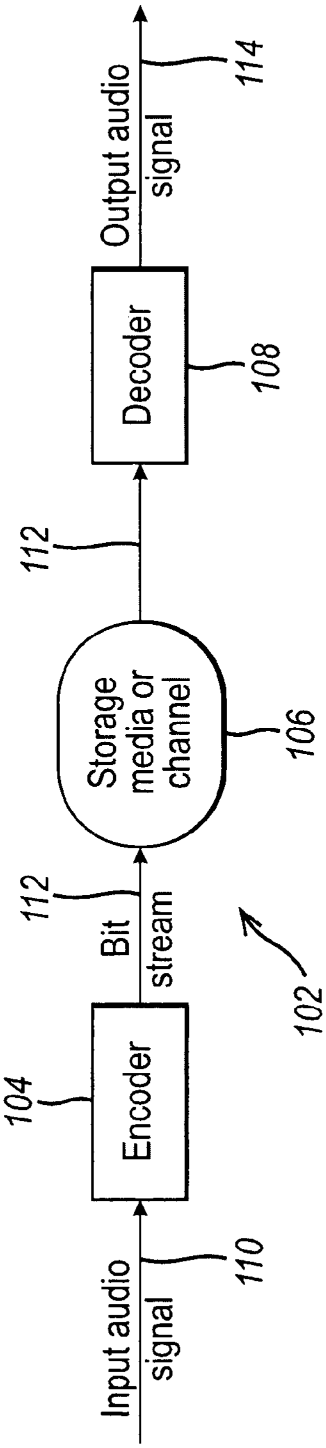
FIG. 2 shows schematically an audio codec system employing embodiments of the present invention.

The general operation of audio codecs as employed by embodiments of the invention is shown in FIG. 2. General audio coding/decoding systems consist of an encoder and a decoder, as illustrated schematically in FIG. 2. Illustrated is a system 102 with an encoder 104, a storage or media channel 106 and a decoder 108.

The encoder 104 compresses an input audio signal 110 producing a bit stream 112, which is either stored or transmitted through a media channel 106. The bit stream 112 can be received within the decoder 108. The decoder 108 decompresses the bit stream 112 and produces an output audio signal 114. The bit rate of the bit stream 112 and the quality of the output audio signal 114 in relation to the input signal 110 are the main features, which define the performance of the coding system 102.

FIG. 3 depicts schematically an encoder according to an embodiment of the invention. The encoder comprises inputs 203 and 205 which are arranged to receive an audio signal comprising two channels. The two channels may be arranged as a stereo pair comprising a left and right channel. However, it is to be understood that further embodiments of the present invention may be arranged to receive more than two input audio signal channels, for example a six-channel input arrangement may be used to receive a 5.1 surround sound audio channel configuration.

FIG. 3 depicts schematically an encoder 104 according to an embodiment of the invention. The encoder 104 comprises a left channel input 203 and a right channel input 205 which are arranged to receive an audio signal comprising two channels. The two channels may be arranged as a stereo pair comprising a left channel audio signal and a right channel audio signal. Thus, the left channel input 203 receives the left channel audio signal and right channel input 205 receives the right channel audio signal.

It is to be understood that further embodiments of the present invention may be arranged to receive more than two input audio signal channels, for example a sixth channel input arrangement may be used to receive a 5.1 surround sound audio channel configuration.

The left channel input 203 is connected to a first input of a combiner 251 and to an input to a left channel time-to-frequency domain transformer 255. The right channel input 205 is connected to an input of a right channel time-to-frequency domain transformer 257 and to a second input to the combiner 251. The combiner 251 is configured to provide an output connected to an input of a mono channel encoder 253. The mono channel encoder 253 is configured to provide an output connected to an input of a bit stream formatter (multiplexer) 261. The left channel time-to-frequency domain transformer 255 is configured to provide an output connected to an input of a difference encoder 259. The right channel time-to-frequency domain transformer 257 is configured to provide an output connected to a further input of the difference encoder 259. The difference encoder 259 is configured to provide an output connected to a further input of the bit stream formatter 261. The bit stream formatter 261 is configured to provide an output which is connected to the encoder 104 output 206.

The operation of the components as shown in FIG. 3 are described in more detail with reference to the flow chart of FIG. 4 showing the operation of the encoder 104.

The audio signal is received by the encoder 104. In a first embodiment of the invention, the audio signal is a digitally sampled signal. In other embodiments of the present invention, the audio input may be an analogue audio signal, for example from a microphone 6 as shown in FIG. 1, which is then analogue-to-digitally (ND) converted. In further embodiments of the invention, the audio signal is converted from a pulse-code modulation digital signal to amplitude modulation digital signal.

The receiving of the audio signal is shown in FIG. 4 by step 301.

The channel combiner 251 receives both the left and right channels of the stereo audio signal and combines them to generate a single mono audio channel signal. In some embodiments of the present invention, this may take the form of adding the left and right channel samples and then dividing the sum by two. The combiner 251 in a first embodiment of the invention, employs this technique on a sample by sample basis in the time domain.

In further embodiments of the invention, including those which employ more than two input channels, down mixing using matrixing techniques may be used to combine the channels. This combination may be performed either in the time or frequency domains.

The combining of audio channels is shown in FIG. 4 by step 303.

The mono encoder 253 receives the combined mono audio signal from the combiner 251 and applies a suitable mono encoding scheme upon the signal. In an embodiment of the invention, the mono encoder 253 may transform the signal into the frequency domain by the means of a suitable discrete unitary transform of which non-limiting examples may include the discrete Fourier transform (DFT) or the modified discrete cosine transform (MDCT). Equally in some embodiments of the invention, the mono encoder 253 may use an analysis filter bank structure in order to generate a frequency domain base representation of the mono signal. Examples of the filter bank structures may include but are not limited to quadrature mirror filter banks (QMF) and cosine modulated pseudo QMF filter banks.

The mono encoder 253 may in some embodiments of the invention have the frequency domain representation of the encoded signal grouped into sub-bands/regions.

In some embodiments of the invention the received mono audio signal may be quantized and coded using information provided by a psychoacoustic model. The mono encoder 253 may further generate the quantisation settings as well as the coding scheme dependent on the psycho-acoustic model applied.

The mono encoder 253 in other embodiments of the invention may employ audio encoding schemes such as advanced audio coding (AAC), MPEG-1 layer 3 (MP3), ITU-T embedded variable rate (EV-VBR) speech coding base line codec, adaptive multi rate-wide band (AMR-WB) and adaptive multi rate wide band plus (AMR-WB+) coding mechanism.

The mono encoded signal (together with quantization settings in some embodiments of the invention) are output from the mono encoder 253 and passed to the bitstream formatter 261.

The encoding of the mono channel audio signal is shown in FIG. 4 by step 305.

The left channel time domain signal $t_L$ from the left channel input 203 is also received by the left channel time-to-frequency domain transformer 255. The left channel time-to-frequency domain transformer 255 transforms the received left channel time domain signal into a left channel frequency domain representation. In embodiments of the invention, the time-to-frequency domain transformer 255 carries out the transformation on a frame by frame basis. In other words, a group of time domain samples are analysed to produce a frequency domain average for that time period.

In a first embodiment of the invention, the time-to-frequency domain transformer is based on a variant of the discrete Fourier transform (DFT). In some embodiments of the invention, the shifted discrete Fourier transform (SDFT) is applied to the frame of time domain samples to produce the frequency domain representation spectral coefficients. In further embodiments of the invention, the time-to-frequency domain transformer 255 may use other discrete orthogonal transforms. Examples of other discrete orthogonal transforms include but are not limited to the modified discrete cosine transform (MDCT) and modified lapped transform (MLT). The output of the time-to-frequency domain transform 255 is a series of spectral coefficient $f_L$. The left channel time to frequency domain transformer outputs the frequency domain spectral coefficients to the difference encoder 259.

The right channel time to frequency transformer 257 furthermore transforms the received right channel time domain audio signal $t_R$ from the right channel input 205 to produce a right channel frequency domain representation in a similar manner to that of the left channel time to frequency domain transformer 255.

The right time-to-frequency domain transformer 257 thus may concurrently transform the right channel time domain audio signal into a right channel frequency domain representation utilising the same frame structure as the left channel time-to-frequency domain transformer 255.

In some embodiments of the invention, the left and right time-to-frequency domain transformers 255 and 257 are combined into a single time-to-frequency domain transformer arranged to carry out the time-to-frequency domain transformations for the left and right channels at the same time.

The output of the right time-to-frequency domain transformer 257 outputs right channel frequency representation spectral coefficients $f_R$ to the difference encoder 259.

The transformation of the left and right audio channels into the frequency domain is shown in FIG. 4 by step 307.

In an embodiment of the invention, both the left and right channel time to frequency domain transformers 255 257 further group the generated spectral coefficient values into sub-bands or regions.

In a first embodiment of the invention the left and right channel time to frequency domain transformers 255 257 group the generated spectral coefficient values into two sub-bands or regions. It is understood that further embodiments of the invention the left and right channel time to frequency domain transformers 255, 257 may group the generated spectral coefficient values into more than two regions/sub-bands where the coefficients may be distributed to each region/sub-band in a hierarchical manner.

Each sub-band/region may contain a number of frequency or spectral coefficient. The allocation and the number of frequency or spectral coefficients per sub-band/region may be fixed, in other words does not alter from frame to frame or may be variable—in other words, may alter from frame to frame. Furthermore, in some embodiments of the present invention, the grouping of the frequency or spectral coefficients in the region/sub-bands may be uniform—in other words each region/sub-band has an equal number of spectral coefficient values, or may be non-uniform—in other words, each region/sub-band may have a different number of spectral coefficients.

The distribution of frequency spectral coefficient values to regions/sub-bands may be determined in some embodiments of the invention according to psycho-acoustical principles.

The difference encoder 259 on receiving the left channel frequency representation and the right channel frequency representation may then perform MS and IS encoding on the frequency spectral coefficient on a frame by frame and region/sub-band by region/sub-band basis.

In some embodiments of the invention the encoder may furthermore comprise a decoder checking element which may determine if at the receiver as described below for a specific sub-band within a specific time period whether both the MS and IS encoded data is required to decode the signal. Where one or other of the MS or IS encoded data is not required the checking element may control the difference encoder 259 to produce only the one of the MS and IS encoded data and therefore reduce the required coding processing requirements and also the encoded signal bandwidth requirements. In some embodiments of the invention the checking element is the guidance bit generator 263 which as described hereafter may determine using the information generated in the guidance bit generator 263 whether post processing may be required in the decoder 108 and furthermore whether post processing will select the IS or MS coded data to post process a mono decoded signal using the same criteria as will be described in the decoder.

For example the difference encoder 259 receives the frame spectral coefficient values and then may process on a sub-band by sub-band basis the left and right spectral coefficients to determine which of the two channels is the dominant channel for each sub-band and encode the intensity stereo information dependent on the dominant channel for that sub-band. Furthermore, the difference encoder 259 may encode the difference between the left and right channels to produce a pure difference of spectral coefficient values.

The sub-band grouping may be recorded and operated by storing an array of offset values which define the number of spectral coefficients per sub-band. This array may be defined as a sbOffset variable, so that the value of sbOffset[i] is the value of the spectral coefficient index which is the first index in the i'th sub-band and the sbOffset[i+1]−1 is the value of the spectral coefficient index which is the last index in the i'th sub-band.

The difference and intensity gain values may further be quantized before being passed to the bit stream formatter 261.

The determination of the difference between the left and right channels can be seen in FIG. 4 by step 309.

Furthermore the encoding of the difference and the stereo encoding and quantization operations can be seen in FIG. 4 by step 311.

In some embodiments of the invention an optional guidance bit generator 263, shown in FIG. 3 by a dashed box, receives the left channel frequency domain representation $f_L$ from the left channel time to frequency domain transformer 255 and the right channel frequency domain representation $f_R$ from the right channel time to frequency domain transformer 257. The guidance bit generator 263 then calculates the left channel frequency domain energy value $e_L$ by summing the left channel frequency domain representation values for all of the spectral coefficients and similarly calculates the right channel frequency domain energy value $e_R$ by summing the right channel frequency domain representation values for all of the spectral coefficients.

Furthermore either from the outputs of the difference encoder 259, or in some embodiments from the left and right channel frequency representation spectral values, the auditory scene location for the current band/region can be calculated.

This may be carried out for example by examining the intensity gain factor difference between the left and the right channels as encoded by the IS encoder part of the difference encoder 259.

For example, the guidance bit generator 263 may generate a flag (or bit indicator) indicating whether or not the dominant channel for the whole frame is the left or right channel audio signal (or in other words the auditory scene is in the left or right channel. The may be determined by adding up the number of times the sub-band has a dominant left channel signal and the number of times the sub-band has a dominant right channel signal. This may be determined by summing the number of sub-bands where the IS gain factor for the left channel is greater than the right channel IS gain factor to generate a left count value ($isPan_L$), and summing the number of sub-bands where the right channel IS gain factor is greater than the left channel IS gain factor to generate a right count value ($isPan_R$). This may be represented by the following equations:

$$isPan_L = \sum_{i=0}^{M-1} \begin{cases} 1, & sfac_L(i) > sfac_R(i) \\ 0, & \text{otherwise} \end{cases}$$

$$isPan_R = \sum_{i=0}^{M-1} \begin{cases} 1, & sfac_R(i) > sfac_L(i) \\ 0, & \text{otherwise} \end{cases}$$

In further embodiments of the invention, where the difference encoder 259 specifically indicates whether the left or right channel is dominant for a sub-band a following alternative method for calculating the variables $isPan_L$ and $isPan_R$ can be to add the indication flag occurrences of LeftPos, indicating a dominant left channel signal and RightPos, indicating a dominant right channel signal. The embodiment may be represented mathematically as follow:

$$isPan_L = \sum_{i=0}^{M-1} \begin{cases} 1, & position[i] == LeftPos \\ 0, & \text{otherwise} \end{cases}$$

$$isPan_R = \sum_{i=0}^{M-1} \begin{cases} 1, & position[i] == RightPos \\ 0, & \text{otherwise} \end{cases}$$

The guidance bit generator 263 furthermore may determine whether or not the left or right channel is completely dominant across all of the sub-bands (In other words, whether or not the variable $isPan_L$ or $isPan_R$ is equal to the number of sub-bands which in this embodiment example is M) using the following expression:

$$isPan = \begin{cases} 1, & isPan_L == M \,\|\, isPan_R == M \\ 0, & \text{otherwise} \end{cases}$$

The guidance bit generator 263 may furthermore determine the strength of the auditory scene by tracking the average ratio between the IS gain factors. In an embodiment of the invention the guidance bit generator 263 determines the strength of the auditory scene using the recursive formula below which produces an average of the difference between the left and right channel information over a series of frames.

$$avgDec = 0.7 \cdot avgDec + 0.3 \cdot avg\mathrm{Gain}$$

where $$avgGain = \frac{1}{M} \cdot \sum_{i=0}^{M-1} \frac{\mathrm{MAX}(sfac_L(i), sfac_R(i))}{\mathrm{MIN}(sfac_L(i), sfac_R(i))}$$

In embodiments of the invention where the difference encoder 259 has passed a specific gain value which relates to the ratio of the difference then this may be used instead to generate the avgGain variable:

$$avgGain = \frac{1}{M} \cdot \sum_{i=0}^{M-1} gainLR(i)$$

The guidance but generator 263 produces these smoothed and tracking auditory gains to provide a guidance bit indicating to the decoder where post processing is required. The guidance bit may be set according to a variable enable_post_processing as shown below $$encBit = \begin{cases} 1, & \text{enable\_post\_proc} == 1 \\ 0, & \text{otherwise} \end{cases}$$

where the enable_post_processing variable is set where one channel is totally dominant, in other words the scene is located in the same channel for all of the sub-bands, the averaged energy level difference between the left and right channels is greater than a predefined value, which is in this example 2 indicating a 3 db difference, and the current frame energy level difference between the left and right channels is greater than a further defined value, which in this example is 4. This can be represented by the following expressions:

$$\text{enable\_post\_proc} = \begin{cases} 1, & isPan == 1 \text{ and } avgDec > 2.0 \text{ and } chGain > 4 \\ 0, & \text{otherwise} \end{cases}$$

$$chGain = \begin{cases} \frac{e_L}{e_R}, & e_L > e_R \\ \frac{e_R}{e_L}, & \text{otherwise} \end{cases}$$

$$e_L = \sum_{i=0}^{N-1} f_L(i)^2$$

$$e_R = \sum_{i=0}^{N-1} f_R(i)^2$$

The bit stream formatter receives the mono encoded signal either in the time or frequency domain dependent on the embodiment, and the difference, and/or intensity difference encoded signal from the difference encoder 259, and in further embodiments of the invention the guidance bit.

The bit stream formatter having received the encoded signals multiplexes or formats the bit stream to produce the output bit stream 112 and outputs the bit stream on the encoder output 206.

The bit stream processing is shown in FIG. 4 by step 313.

FIG. 5 shows a schematic view of a decoder according to a first embodiment of the invention. The decoder 108 comprises an input 401 which is arranged to receive an encoded audio signal. The input 401 is configured to be connected to an input of a bit stream unpacker (or demultiplexer) 451. The bit stream unpacker is arranged to have an output configured to be connected to an input of a mono decoder 453, a second output configured to be connected to an input of a mid-side decoder/dequantizer 457 and a third output configured to be connected to an input of an intensity stereo decoder/dequantizer 459.

The mono decoder 453 has an output configured to be connected to an input of a time-to-frequency domain transformer 455. The time-to-frequency domain transformer 455 is configured to have an output which is connected to a further input of the mid-side decoder/dequantizer 457, a further input of the intensity stereo decoder/dequantizer 459 and an input of a spectral post processor 465. The mid-side decoder is configured to have an output connected to a second input of the spectral processor 465. The intensity stereo decoder/dequantizer 459 is configured to have an output connected to an input of the auditory scene locator 461 and a third input to the spectral post processor 465. The auditory scene locator is configured to have an output connected to an input of an auditory gain processor 463. The auditory gain processor is configured to have an output connected to a fourth input to the spectral post processor 465. The spectral post processor 465 is configured to have a first output which configured to be connected to the left channel frequency-to-time domain transformer 467 and a second output connected to the right channel frequency-to-time domain transformer 469. The left channel frequency-to-time domain transformer 467 is configured to have an output connected to the left channel decoder output 407.

The right channel frequency-to-time domain transformer 469 is configured to have an output connected to the right channel decoder output 405.

With respect to FIG. 6, the operations of the embodiments of the decoder 108 part of the present invention are described in more detail.

The encoded signal is received at the input 401 of the decoder 108 and passed to the bit stream unpacker 451.

The step of receiving the encoded audio signal is shown in FIG. 6 by step 501.

The bit stream unpacker 451 partitions, unpacks or demultiplexes the encoded bit stream 112 into at least three separate bit streams. The mono encoded bit stream is passed to the mono decoder 453, the mid-side information is passed to the MS decoder/dequantizer 457, and the intensity stereo information is passed to the IS decoder/dequantizer 459.

The operation of unpacking or demultiplexing the encoded audio signal is shown in FIG. 6 by step 503.

The mono decoder 453 receives the mono encoded signal. The mono decoder 453 performs a mono decoding operation, which is the complementary operation to the mono encoding process carried out by the mono encoder 253 within the encoder 104.

The embodiment shown in FIG. 5 shows an embodiment where the mono encoding was carried out in the time domain and therefore the complementary process is that the mono decoder 453 carries out a mono decoding within the time domain also.

The time domain mono decoded signal is output to a time-to-frequency domain transformer 455.

In other embodiments of the invention where the mono encoding was carried out in the frequency domain or the mono encoding process resulted in a frequency domain encoded signal then the mono decoder performs the complementary frequency domain decoding and outputs a frequency domain signal to the mid-side decoder/dequantizer 457, the intensity stereo decoder/dequantizer 459, and the spectral postprocessor 465 directly. In such embodiments of the invention the time to frequency domain transformer 455 is an optional component of the invention.

The mono decoding of the mono encoded signal is shown in FIG. 6 by step 505.

The time-to-frequency domain transformer 455 converts received mono audio signal from the mono-decoder from the time domain to the frequency domain.

The time-to-frequency domain transformer 455 may perform any of the time-to-frequency domain transformation operations employed by the encoder 104 left and right channel time-to-frequency domain transformers 255, 257 in order to generate a frequency domain representation of the mono decoded audio signal with similar operational variables as those produced by the encoder 104 left and right channel time-to-frequency domain transformers 255, 257. In other words the time-to-frequency domain transformer 455 is operated to produce similar frame, sub-band and coefficient spacing values as those produced by the encoder 104 left and right channel time-to-frequency domain transformers 255, 257.

The frequency domain representation $f_m$ of the mono audio signal is passed to the mid-side decoder/dequantizer 457, the intensity stereo decoder/dequantizer 459 and to the spectral post processor 465.

The time-to-frequency domain transformation step is shown in FIG. 6 by step 511.

The intensity stereo decoder/dequantizer 459 receives the IS information from the bit stream unpacker 541 and also the mono encoded frequency domain spectral coefficients. The IS decoder/dequantizer extracts the left and right channel samples corresponding to IS coding by multiplying the mono frequency spectral coefficients for a specific frame and region/sub-band by an intensity factor associated with the specific frame and sub-band received from the bit stream unpacker.

In an embodiment of the present invention, the generation of IS related left and right frequency spectral coefficients may be shown by the following equations:

$$f_{L_{IS}}(j)=f_M(j)\cdot sfac_L(i),\ sb\text{Offset}[i]\le j<sb\text{Offset}[i+1]$$

$$f_{R_{IS}}(j)=f_M(j)\cdot sfac_R(i)$$

The equations define the current spectral coefficient index to be multiplied as j. The process is applied for all j values. I defines which sub-band the process is currently operating within and thus goes from 0 to M−1 where M is the number of frequency regions/sub-bands and as described previously sbOffset is the table or array describing the frequency offset index values for the frequency sub-bands. $f_M(j)$ is the spectral coefficient value for spectral index j for the mono signal (which in embodiments of the invention may be the MDCT transformed mono audio signal), and $sfac_L(i)$ and $sfac_R(i)$ are the IS derived gain factors for the left and right channels respectively for the i'th sub-band.

In some further embodiments of the invention the $sfac_R$ and $sfac_L$ values are reconstructed by dequantizing received quantized gain values in a complementary process to any quantization of the IS gains in the difference encoder 259.

The left and right channels frequency spectra according to the IS decoder/dequantization process are then output to the spectral processor.

The step of IS decoding and dequantization is shown within FIG. 6 by step 507.

Furthermore, the IS information is also passed to the auditory scene locator 461.

The auditory scene locator 461 determines the location of the current auditory scene for the current band/region. This may be carried out by examining the intensity gain factor difference between the left and the right channels as encoded by the IS encoder part of the difference encoder 259.

For example, the auditory scene locator 461 may generate a flag (or bit indicator) indicating whether or not the dominant channel for the whole frame is the left or right channel audio signal (or in other words the auditory scene is in the left or right channel. The may be determined by adding up the number of times the sub-band has a dominant left channel signal and the number of times the sub-band has a dominant right channel signal. This may be determined by summing the number of sub-bands where the IS gain factor for the left channel is greater than the right channel IS gain factor to generate a left count value ($isPan_L$), and summing the number of sub-bands where the right channel IS gain factor is greater than the left channel IS gain factor to generate a right count value ($isPan_R$). This may be represented by the following equations:

$$isPan_L=\sum_{i=0}^{M-1}\begin{cases}1, & sfac_L(i)>sfac_R(i)\\ 0, & \text{otherwise}\end{cases}$$

$$isPan_R=\sum_{i=0}^{M-1}\begin{cases}1, & sfac_R(i)>sfac_L(i)\\ 0, & \text{otherwise}\end{cases}$$

In further embodiments of the invention, where the encoder specifically indicates whether the left or right channel is dominant for a sub-band a following alternative method for calculating the variables $pan_L$ and is $pan_R$ can be to add the indication flag occurrences of LeftPos, indicating a dominant left channel signal and RightPos, indicating a dominant right channel signal. The embodiment may be represented mathematically as follow:

$$isPan_L=\sum_{i=0}^{M-1}\begin{cases}1, & \text{position}[i]==LeftPos\\ 0, & \text{otherwise}\end{cases}$$

$$isPan_R=\sum_{i=0}^{M-1}\begin{cases}1, & \text{position}[i]==RightPos\\ 0, & \text{otherwise}\end{cases}$$

The auditory scene locator 461 furthermore determines whether or not the left or right channel is completely dominant across all of the sub-bands (In other words, whether or not the variable $pan_L$ or $pan_R$ is equal to the number of sub-bands which in this embodiment example is M). The auditory scene locator may calculate this value using the following expression:

$$isPan=\begin{cases}1, & isPan_L==M\ \|\ isPan_R==M\\ 0, & \text{otherwise}\end{cases}$$

The auditory gain processor furthermore determines the strength of the auditory scene by tracking the average ratio between the IS gain factors. In an embodiment of the invention the auditory gain processor determines the strength of the auditory scene using the recursive formula below which produces an average of the difference between the left and right channel information over a series of frames.

$$avgDec=0.7\cdot avgDec+0.3\cdot avg\text{Gain}$$

where $$avgGain=\frac{1}{M}\cdot\sum_{i=0}^{M-1}\frac{\text{MAX}(sfac_L(i),\ sfac_R(i))}{\text{MIN}(sfac_L(i),\ sfac_R(i))}$$

In embodiments of the invention where the encoder 104 has passed a specific gain value which relates to the ratio of the difference then this may be used instead to generate the avgGain variable:

$$avgGain=\frac{1}{M}\cdot\sum_{i=0}^{M-1}gainLR(i)$$

The auditory gain processor 463 produces this smoothed and tracking version of the auditory gain to provide a reliable detection for the post processor. The auditory scene locator 461 or auditory gain processor 463 may initialise the avgDec value to be 1 at start up.

The determination of the location and strength of the auditory scene is shown in FIG. 6 by step 513.

The MS decoder/dequantizer 457 generates the side channel signal information $f_S$ from the side channel information passed to it from the bit stream unpacker 451. This procedure may be the complementary procedure to that used by the difference encoder 259 in the encoder 104. The MS decoder/dequantizer furthermore extracts the information using a dequantization scheme to reverse the quantization of the side channel information applied during the difference encoder part of the encoder 104. The quantization scheme and the dequantization scheme may be any suitable scheme. For example, a quantization and dequantization may be based on a perceptual or psycho-acoustic process for example an AAC process or vector quantization in the current baseline Q9 codec, or a combination of suitable quantization schemes.

The side (M/S) channel decoding/dequantization is shown in FIG. 6 by step 509.

The spectral postprocessor 465 determines whether or not post processing of the signal is required. For example, in one embodiment of the invention the spectral postprocessor 465 determines that post processing may occur where either the left or right channel is totally dominant throughout the whole of the frequency domain (in other words across all of the sub-bands the same channel is dominant). In an embodiment of the invention this is determined when the variable is Pan, determined in the auditory scene locator, is equal to 1.

In further embodiments of the invention the spectral postprocessor 465 furthermore determines that post-processing may occur when one or other channel is totally dominant and there is a 3 decibel difference between the tracked average of the left and right channel audio signals. This difference may be determined using the avgGain variable value determined in the auditory gain processor 463.

This may be summarized by the following expression:

$$\text{post\_proc} = \begin{cases} 1, & isPan == 1 \text{ and } avgDec > 2.0 \\ 0, & \text{otherwise} \end{cases}$$

The spectral postprocessor 465 after determining that post processing is required determines on a sub-band by sub-band basis which channel is dominant and outputs a dominant channel frequency representation which is equal to the mono decoded signal and the difference component from the M/S decoder and a non-dominant channel frequency representation which is the non-dominant IS frequency representation.

In other words if the variable post_proc is equal to 1 (indicating post processing is required) and the right IS factor is greater than the left IS factor for a specific sub-band then the output frequency spectrum for the left channel for a specific spectral coefficient is equal to the intensity spectral value for the left frequency coefficient and the right frequency coefficient is equal to a difference between the mono and side band value. Otherwise, if the left IS factor is greater than the right IS factor then the spectral post processor 465 generates a right spectral output which is equal to the right intensity spectral coefficient and a left spectral output value which is equal to the sum of the mono and the side band information.

In further embodiments of the invention the spectral postprocessor 465 may determines that post-processing may occur when one or other channel is totally dominant, there is a 3 decibel difference between the tracked average of the left and right channel audio signals, and the ratio of the current dominant channel frequency domain energy value over the non-dominant channel frequency domain energy value is greater than a predetermined value. In a first of the further embodiments of the invention the predetermined value is where the dominant energy is four times the non-dominant energy value.

This may be implemented in embodiments of the invention by using a guidance bit encBit value. Thus the decision can be written as:

$$\text{post\_proc} = \begin{cases} 1, & isPan == 1 \text{ and } avgDec > 2.0 \text{ and } encBit == \text{`}1\text{'} \text{ bit} \\ 0, & \text{otherwise} \end{cases}$$

The guidance bit encBit may further improve the stability of the stereo image as it smoothes instantaneous changes that may occur when calculating the avgGain variable. This is specifically useful when the avgDec variable is close to its threshold—which in embodiments of the invention may be 2 (indicating a 3 db difference in the tracking energy values) or any other suitable value. This difference may be determined using the avgGain variable value determined in the auditory gain processor 463.

In some embodiments of the invention the guidance bit per frame is generated within the decoder using the decoded $f_L$ $f_R$ $f_{Lis}$ $f_{Ris}$ values. In other embodiments of the invention the guidance bit is generated in the encoder as described above and received as part of the encoded bitstream.

If post processing is not required (in other words that the signal is not totally dominant on one or other of the channels or the difference is not greater than 3 decibels), then the spectral post processor 465 outputs left and right channels spectral values dependent on a MS decoding values.

Furthermore where there is no MS information the spectral post processor 465 outputs the left and right channels spectral coefficients dependent on the IS left and right channel coefficients.

The spectral processor therefore in embodiments of the invention may operate according to the pseudo code shown below:

```
for(i = 0; i < M; i++)
{
    for(j = sbOffset[i]; j < sbOffset[i + 1]; j++)
    {
        if(f_S[j] not nonzero)
        {
            tmp_L = f_M[j] + f_S[j]
            tmp_R = f_M[j] − f_S[j]
            if(post_proc equal to 1)
            {
                if(r_panning)
                {
                    f_L[j] = f_LIS[j]
                    f_R[j] = tmp_R
                }
                else
                {
                    f_L[j] = tmp_L
                    f_R[j] = f_RIS[j]
                }
            }
            else
            {
                f_L[j] = tmp_L
```

-continued

```
                fR[j] = tmpR
            }
        }
        else
        {
            fL[j] = fLIS[j]
            fR[j] = fRIS[j]
        }
    }
}
```

where r panning is determined as follows $$\text{r\_panning} = \begin{cases} 1, & sfac_R(i) > sfac_L(i) \\ 0, & \text{otherwise} \end{cases}$$

or channel dominance is indicated by the encoder.

$$\text{r\_panning} = \begin{cases} 1, & \text{position}(i) == RightPos \\ 0, & \text{otherwise} \end{cases}$$

The use of both of the IS and MS information may increase the audio quality in critical signal conditions for low and medium bit rates. Furthermore relatively low computational complexity is required when compared to the prior art solutions.

In further embodiments of the invention the spectral post processor may further enhance the channel separation, in other words widen the stereo image and reduce cross talk (where elements of the left channel are perceived in the right channel and vice versa—and is typically perceived as an annoying artefact by the listener) by applying a scaling factor to the non-dominant channel signal when calculated using the MS information, wherein the scaling factor is generated by inverting the square root of the average energy ratio avgDec.

The spectral post processor 465 may operate the following pseudocode to follow the above embodiment.

```
for(i = 0; i < M; i++)
{
    for(j = sbOffset[i]; j < sbOffset[i + 1]; j++)
    {
        if(fS[j] not nonzero)
        {
            tmpL = fM[j] + fS[j]
            tmpR = fM[j] - fS[j]
            if(post_proc equal to 1)
            {
                if(r_panning)
                {
                    fL[j] = tmpL · scale
                    fR[j] = tmpR
                }
                else
                {
                    fL[j] = tmpL
                    fR[j] = tmpR · scale
                }
            }
            else
            {
                fL[j] = tmpL
                fR[j] = tmpR
            }
        }
        else
```

-continued

```
        {
            fL[j] = fLIS[j]
            fR[j] = fRIS[j]
        }
    }
}
```

where $$\text{scale} = 1/\sqrt{avgDec}$$

The embodiments of the invention described above describe the codec in terms of separate encoders 104 and decoders 108 apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some/or all common elements.

Although the above examples describe embodiments of the invention operating within a codec within an electronic device 10, it would be appreciated that the invention as described below may be implemented as part of any variable rate/adaptive rate audio (or speech) codec. Thus, for example, embodiments of the invention may be implemented in an audio codec which may implement audio coding over fixed or wired communication paths.

Thus user equipment may comprise an audio codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code the at least one memory and the computer program code configured to, with the at least one processor, cause the apparatus at least to: for decoding an encoded signal configured to:

divide the encoded signal received for a first time period into at least a mono encoded signal, a mid side information and an intensity stereo information, wherein the mono encoded signal, the mid side information and the intensity stereo information represent an encoded first and second channels of a multichannel audio signal;

generate a mono decoded signal dependent on the mono encoded signal part;

generate the first and second channels of the multichannel audio signal dependent on the mono decoded signal, and at least one of the mid side information and the intensity stereo information of the encoded signal, and wherein the mid side information of the encoded signal comprises at least one side channel value, and wherein the intensity stereo information part of the encoded signal comprises at least one intensity side channel encoded value; and determine at least one characteristic of the encoded signal associated with at least one sub band of the first and second channels of the multi-channel audio signal, wherein the apparatus comprises a spectral post processor configured to determine whether or not post-processing of the encoded signal is required dependent on the at least one characteristic, and when it is determined that post processing of the encoded signal is not required the apparatus is configured to generate spectral coefficients for the first and second channels for the at least one sub band of the multi-channel audio signal dependent on the side channel value for the at least one sub band from the mid side information.

2. The apparatus as claimed in claim 1, wherein the characteristic comprises at least one of:

an auditory gain greater than a threshold value;

an auditory scene being wholly located in at least one of the encoded first and second channels; and the second part not being null.

3. The apparatus as claimed in claim 1, wherein the mono decoded signal comprises at least one combined channel frequency domain representation, and wherein the at least one combined channel frequency domain representation comprises at least two combined channel spectral coefficient sub bands, each combined channel spectral sub band comprising at least one spectral coefficient value.

4. The apparatus as claimed in claim 1, wherein the at least one side channel value is dependent on a difference between a first channel spectral coefficient value and the second encoded channel spectral coefficient value.

5. The apparatus as claimed in claim 1 wherein each intensity side channel encoded value comprises an encoded energy ratio between the maximum of a sub band of the first encoded channel spectral coefficients and a sub band of the second encoded channel spectral coefficients, and the minimum of the sub band of the first encoded channel spectral coefficients and the sub band of the second encoded channel spectral coefficients.

6. The apparatus as claimed in claim 1 wherein the mono encoded signal is an encoded combined channel time domain audio signal.

7. A method comprising:

dividing an encoded signal received for a first time period into at least a mono encoded signal, a mid side information and an intensity stereo information, wherein the mono encoded signal, the mid side information and the intensity stereo information represent an encoded first and second channels of a multichannel audio signal;

generating a mono decoded signal dependent on the mono encoded signal part; and generating the first and second channels of the multichannel audio signal dependent on the mono decoded signal, and at least one of the mid side information and the intensity stereo information of the encoded signal, and wherein the mid side information of the encoded signal comprises at least one side channel value, and wherein the intensity stereo information part of the encoded signal comprises at least one intensity side channel encoded value; and determining at least one characteristic of the encoded signal associated with at least one sub band of the first and second channels of the multi-channel audio signal, wherein the apparatus comprises a spectral post processor configured to determine whether or not post-processing of the encoded signal is required dependent on the at least one characteristic, and when it is determined that post processing of the encoded signal is not required the apparatus is configured to generate spectral coefficients for the first and second channels for the at least one sub band of the multi-channel audio signal dependent on the side channel value for the at least one sub band from the mid side information.

8. The method as claimed in claim 7, wherein the characteristic comprises at least one of:

an auditory gain greater than a threshold value;

an auditory scene being wholly located in at least one of the encoded first and second channels; and the second part not being null.

9. The method as claimed in claim 7, wherein the mono decoded signal comprises at least one combined channel frequency domain representation, and wherein each combined channel frequency domain representation comprises at least two combined channel spectral coefficient sub bands, each combined channel spectral sub band portion comprising at least one spectral coefficient value.

10. The method as claimed in claim 7, wherein each side channel value is dependent on a difference between a first channel spectral coefficient value and the second encoded channel spectral coefficient value.

11. The method as claimed in claim 7, wherein each intensity side channel encoded value comprises an encoded energy ratio between the maximum of a sub band of the first encoded channel spectral coefficients and a sub band of the second encoded channel spectral coefficients, and the minimum of the sub band of the first encoded channel spectral coefficients and the sub band of the second encoded channel spectral coefficients.

12. The method as claimed in claim 7, wherein the mono encoded signal is an encoded combined channel time domain audio signal.

* * * * *